(12) United States Patent
Park

(10) Patent No.: US 6,848,784 B1
(45) Date of Patent: Feb. 1, 2005

(54) EYEGLASS DEVICE HAVING PRIMARY AND AUXILIARY SPECTACLE FRAMES

(75) Inventor: Yong Jin Park, Daegu (KR)

(73) Assignee: Inter Hi-Tech Co., Ltd., Daegu (KR)

( * ) Notice: Subject to any disclaimer, the term of this patent is extended or adjusted under 35 U.S.C. 154(b) by 0 days.

(21) Appl. No.: 10/789,745

(22) Filed: Feb. 26, 2004

(30) Foreign Application Priority Data

Sep. 26, 2003 (KR) .............................. 20-2003-0030480 U

(51) Int. Cl.⁷ .............................................. G02C 9/00
(52) U.S. Cl. ......................................... 351/47; 351/57
(58) Field of Search .............................. 351/44, 47, 48, 351/57, 58, 41

(56) References Cited

U.S. PATENT DOCUMENTS 6,053,611 A * 4/2000 Ku .............................. 351/47
6,474,811 B2 * 11/2002 Liu .............................. 351/47
6,695,448 B2 * 2/2004 Xiao ........................... 351/57
6,702,439 B1 * 3/2004 Lee .............................. 351/47

* cited by examiner

*Primary Examiner*—Hung Xuan Dang
(74) *Attorney, Agent, or Firm*—Goodwin Procter LLP; Brian L. Wamsley

(57) ABSTRACT

The present invention relates to an eyeglass device having two pairs of glasses which are integrated together by placing one pair of glasses over the other pair of glasses. There have been methods by which two pairs of glasses are combined into one pair of glasses. However, these glasses have had several problems such as weak combining strength or removal of one pair of glasses for their storage. The present invention comprises primary glasses and auxiliary glasses, the auxiliary glasses being attached to the primary glasses by insert slots formed in the primary glasses in order to improve the combining strength, and are able to be folded up when not used in order to provide the same effect as being removed, without being removed from the primary glasses.

3 Claims, 7 Drawing Sheets

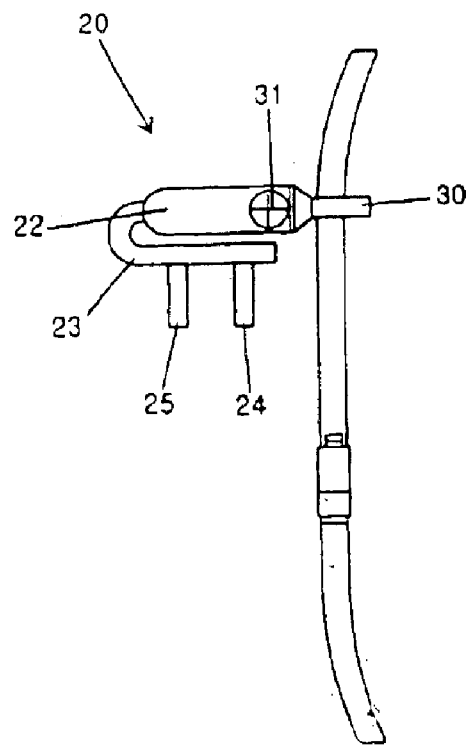
Fig.=5
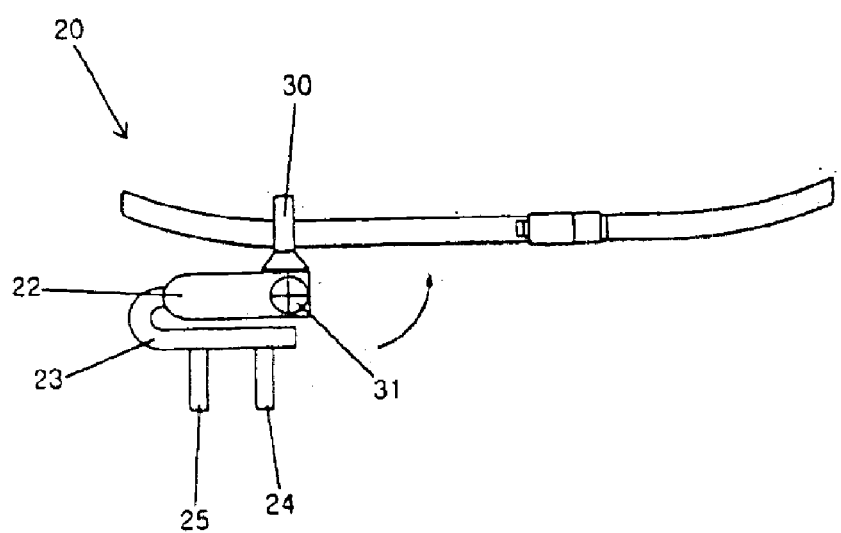
Fig. 6

EYEGLASS DEVICE HAVING PRIMARY AND AUXILIARY SPECTACLE FRAMES

BACKGROUND OF THE INVENTION

1. Field of the Invention

The present invention relates to an eyeglass device having two pairs of glasses which are integrated together by placing one pair of glasses over the other pair of glasses.

We usually wear glasses intended to correct eyesight and sunglasses intended to protect the eyes from sunlight. In addition to these functions, glasses are used to provide wearers with ornamental effect. Generally it has been a common wearing method to wear only one pair of glasses at a time. Therefore, a pair of glasses could not cover the different functions two pairs of glasses provide.

2. Description of the Prior Art

In general, there are two types of glasses; one to correct impaired vision such as near sightedness of farsigtedness, and the other to protect the eyes from the sun's rays. The latter case is sunglasses with coloured lenses sheilding the sun's rays.

Nowadays, people wear glasses for non-functional purposes, for example, as an accessory to change the user's style and image. It is common to wear a single pair of glasses because no useful device has been available to people to wear both types of glasses at one time. While some users wear a single pair of glasses that both corrects vision and provides protection from the sun, i.e., prescription sunglasses, a second pair of corrective glasses is also necessary when the person goes indoors or out of the sun. Thus, the need for a single pair of glasses to fill both needs is not solved.

Double-layered glasses having one pair attached to another have been known in the art. A typical such assembly is disclosed in U.S. Pat. No. 4,070,103 to Meeker. In Meeker, a spectacle frame includes a magnetic material secured to the peripheral portion for attachment of an auxiliary lens rim cover to the frame. The lens cover also includes a magnetic strip for engaging the magnetic material of the spectacle frame.

Another example in disclosed in U.S. Pat. No. 5,416,537 to Sadler, which comprises first magnetic members secured to the temporals of the frames and second magnetic members secured to the corresponding temporal portions of the auxiliary lenses.

In addition, U.S. Pat. No. 5,568,207 to Chao discloses arms having magnetic elements extended rearward from the auxiliary lens for extending over and for engaging with corresponding magnetic elements in the upper portion of the primary spectacle frame.

In these examples of eyeglasses, the auxiliary lenses are simply attached to the frame by magnetic materials and, except for Chao, have not supporting members for preventing the auxiliary lenses from moving downward relative to the frames and may easily be disengaged from the frames when the users engage in mild physical activity. Chao adds arms for limiting slippage in the downward direction, but is not helpful preventing slippage in other directions, such as vertically or laterally, when the user engages in strenuous physical activity. The auxiliary lenses can still be easily dislodged through vibration or being bumped. Also, when the magnetic forces weaken, the auxiliary pair tends to easily disengage.

In order to solve this problem, the present inventor filed U.S. application Ser. No. 09/255,165, which issued as U.S. Pat. No. 6,120,144. This invention was an outer pair of glasses attached to an inner pair by means of a magnet in conjunction with inter-locking hooks. However, that combination of glasses, although an improvement over the prior art, did not allow for the outer pair of glasses to be folded up. The present invention provides this capability as well as much improved attachment means.

There have been glasses similar to the present invention known in the prior art. However, these glasses had a shortcoming in the combining strength because the auxiliary glasses had one piece for magnetic insert in the magnet receiving portion. For dual glasses like the present invention, each pair of glasses is combined together by simply fitting them. If the fitting force is not strong enough, the auxiliary glasses are easily taken off from the primary glasses, causing a considerable inconvenience in using them.

The inventor has also filed application no. 98-16948 for a utility model of an eyeglass device similar to the present invention, which provides the effect of wearing two pairs of glasses together by placing one pair of glasses over the other pair of glasses. The prior invention relates to a dual eyeglass device of which both primary and auxiliary glasses have two permanent magnetic pieces, each being inserted into their bridges in order for them to be combined together.

As in the prior invention the primary and auxiliary glasses have permanent magnetic pieces on both ends of their bridges, the auxiliary glasses were easily detached from the primary glasses when a slight impact was applied or when they were shaken. The wearers could not enjoy sport or exercise with the auxiliary glasses combined with the primary glasses, and had to experience the auxiliary glasses being easily detached when the force of their magnetic pieces became weak.

To solve these problems, the inventor made another invention (Application for Utility Model No. 1999-2182). However, this invention could not completely solve such problems.

However, the present invention provides the auxiliary glasses having two magnet receiving pieces in order to enhance the combining strength. Accordingly, the present invention was made to completely make up for such problems. The eyeglass device according to the present invention is designed to have the auxiliary glasses which have an excellent combining strength and can be folded up, providing a good wearing effect.

Thus, it is an object of the present invention to provide two functions to correct eyesight and to protect the eyes from sunlight.

Another object of the present invention is to provide the effect of wearing two pairs of glasses together by placing one pair of glasses over the other pair of glasses.

A further object of the present invention s to provide a fitting structure so that the auxiliary glasses cannot be easily taken off the primary glasses under shaking and vibration.

SUMMARY OF THE INVENTION

The primary objective of the present invention is to provide a pair of glasses having auxiliary lenses with increased stability and security in being supported in attachment on the frame. Further, the objective of the present invention is to provide the convenience in being able to fold up the auxilairy lenses without having to remove them, thus creating a dual function for the combined pair of glasses.

In accordance with one aspect of the invention, there is provided an eyeglass device which is composed of a pair of primary glasses having comprising temples, frame, lenses; nose pads and a bridge, and a pair of auxiliary glasses also comprising a frame, lenses and a bridge. The auxiliary glasses are combined with the primary glasses by the use of a magnet, the primary glasses having insert slots formed in both temple pieces where a permanent magnetic piece is inserted, and the auxiliary glasses having combining portions comprising a hinge portion and a magnet receiving portion in between magnet receiving pieces of which a piece of the temple fixing portion of the primary glasses is inserted.

The present invention is characterized in that a magnet receiving portion formed in the primary glasses has two magnet receiving pieces in between which an insert piece of the primary glasses is inserted in order to improve the combining strength. The second characteristic of the present invention is that the auxiliary glasses can be folded up, therefore with no need for removal of the auxiliary glasses from the primary glasses.

Magnet receiving pieces are comprised of an insert slot formed in the inner side of both temple pieces of the primary glasses, and a permanent magnetic piece is inserted into an insert piece. Magnetic pieces are also inserted into magnet receiving pieces of the auxiliary glasses. By inserting the insert piece of the primary glasses in between the magnet receiving pieces of the auxiliary glasses, all the magnetic pieces come in contact with each other to maintain the combining force. Particularly, the magnet receiving piece of the auxiliary glasses is inserted tightly into the insert slot of the primary glasses to maintain the strong combined state without shaking.

The foldable function of the auxiliary glasses is created by the combining portion of the auxiliary glasses having a cylindrical hinge. The hinge has a spring and a ball in its inner side, to one end of which a foldable piece is connected by a pin. Accordingly the foldable piece is folded up centering around the pin and the folded state of the foldable piece is maintained by the spring and ball placed in the inner side of the cylindrical hinge portion.

BRIEF DESCRIPTION OF THE DRAWINGS

FIG. 5 is a side view of the auxiliary glasses used in the present invention;

FIG. 6 is a side view showing the folded state of the auxiliary glasses used in the present invention;

DETAILED DESCRIPTION OF THE INVENTION

Figure 1:
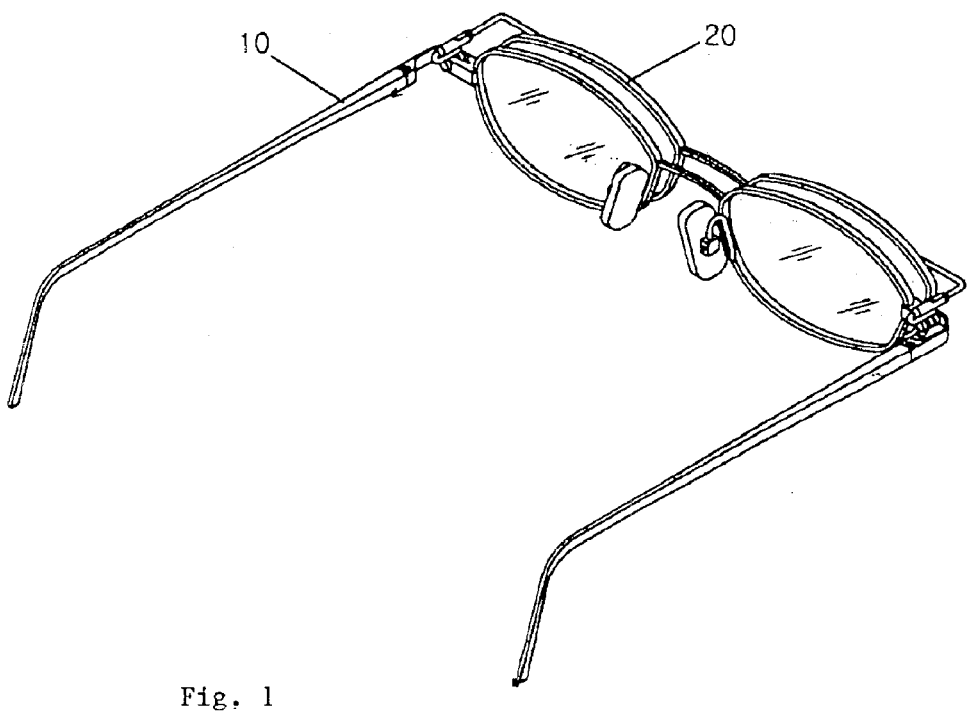
FIG. 1 is a perspective view of combined primary and auxiliary glasses.
Figure 2:
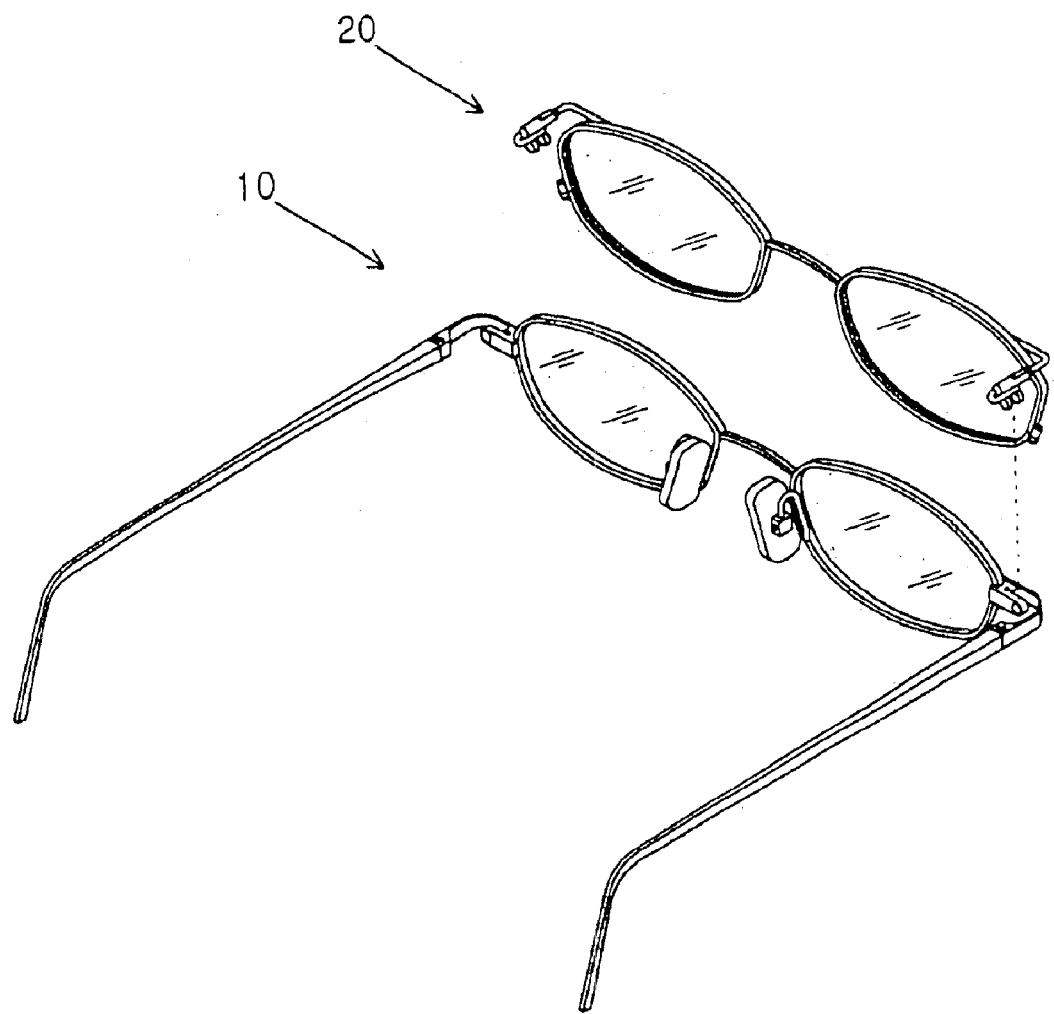
FIG. 2 is an exploded perspective view of the present invention.
Figure 3:
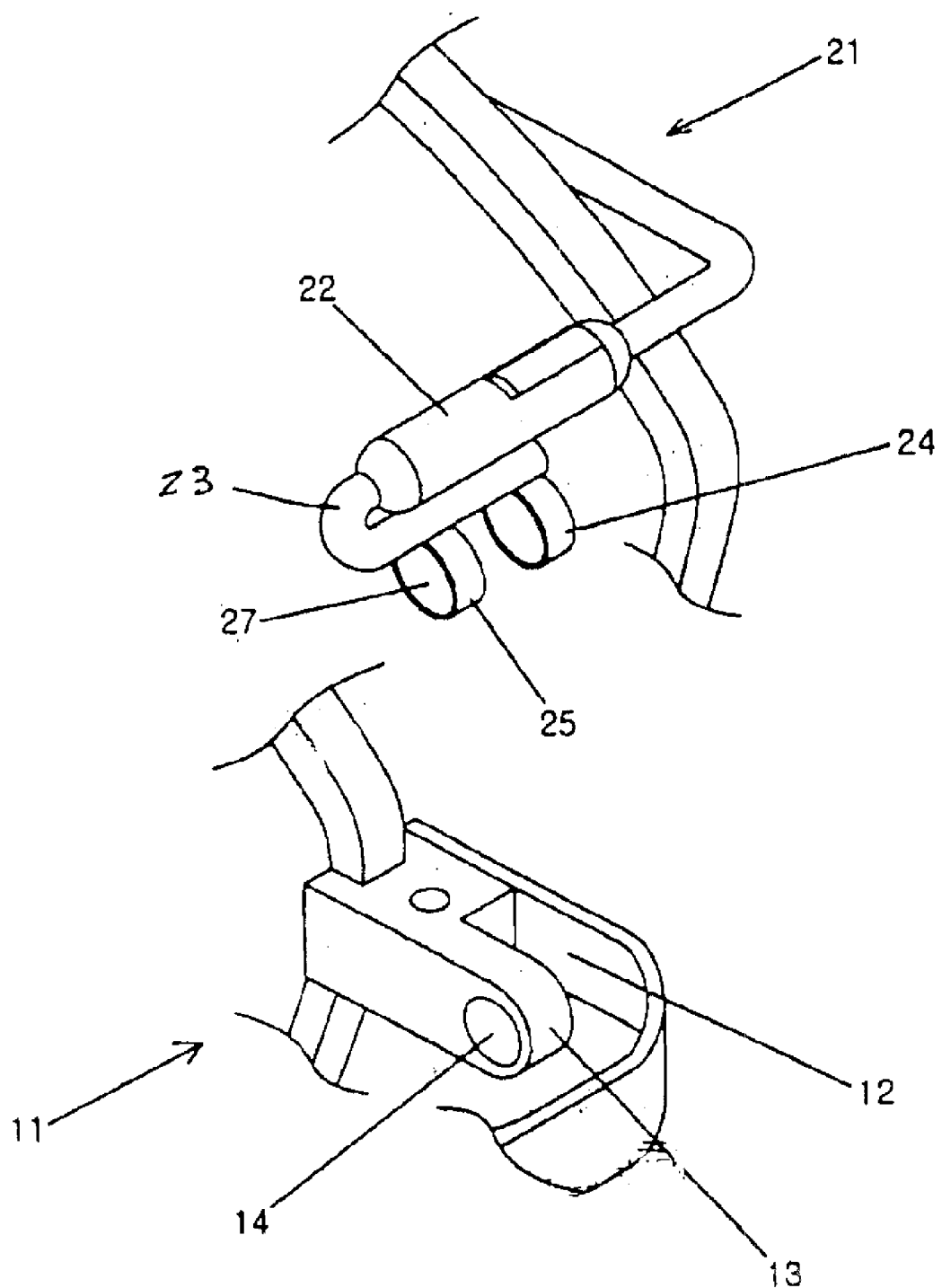
FIG. 3 is a partial enlarged perspective view of the essential portion of the present invention.
Figure 4:
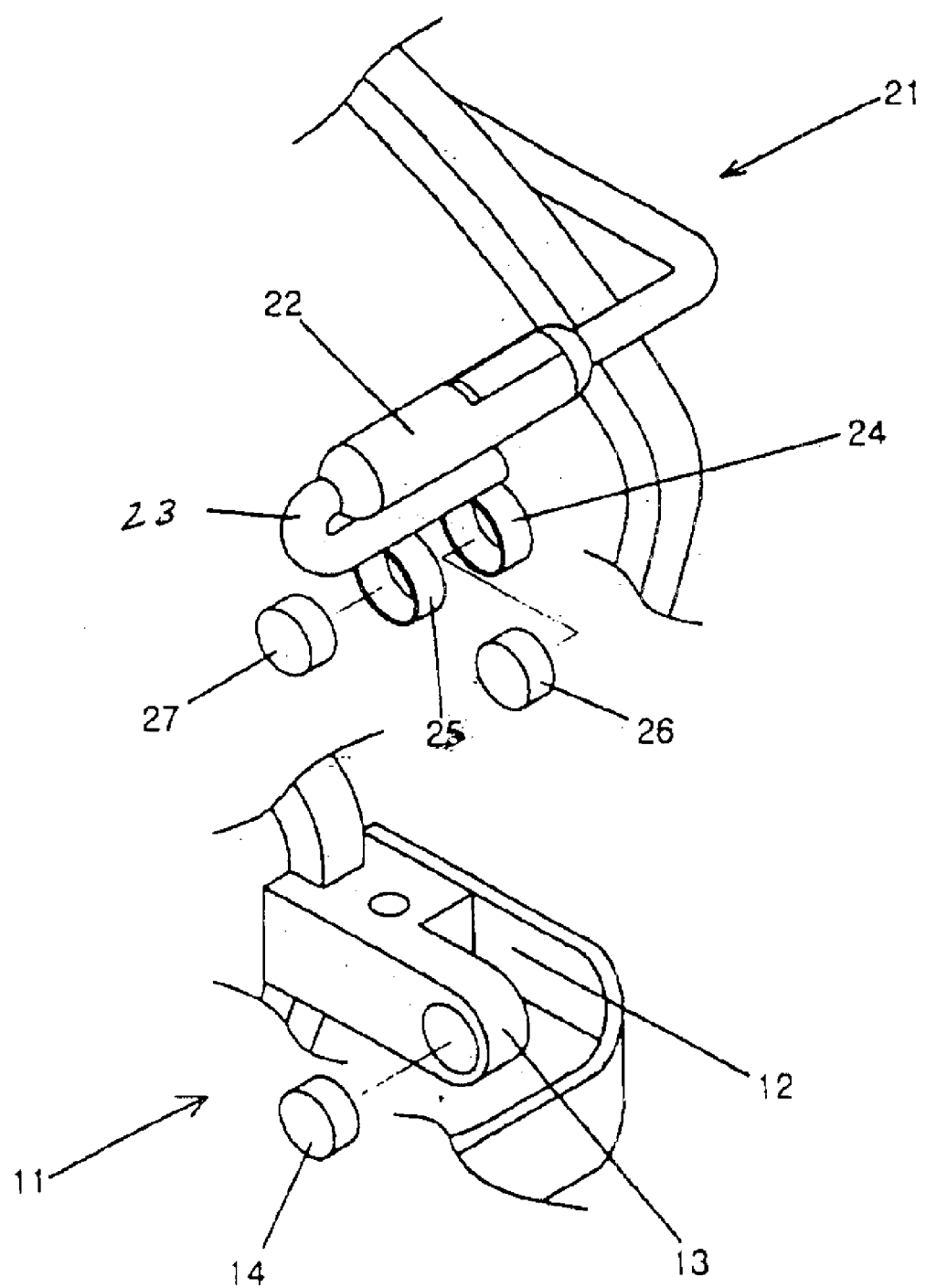
FIG. 4 is a partial enlarged exploded perspective view of the essential portion of the prevent invention.
Figure 7:
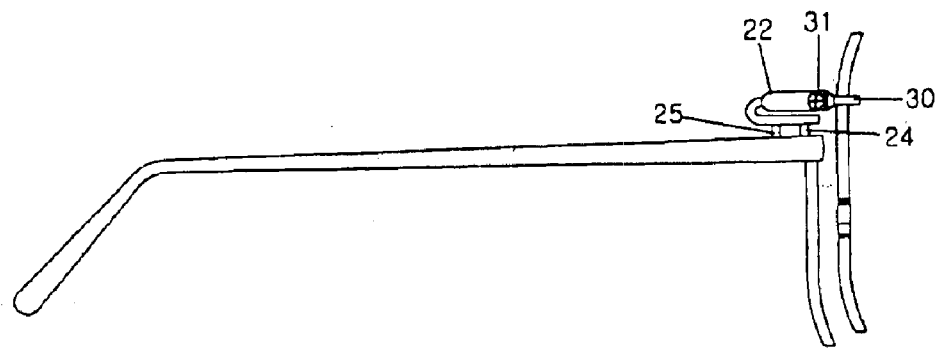
FIG. 7 is a side view of combined primary and auxiliary glasses according to the present invention.

Turning now to the drawings, there is illustrated in FIGS. 1 and 2 the eyeglass device according to the present invention, which is composed of the primary glasses 10 comprising temples, frame, lenses; nose pads and bridge, and the auxiliary glasses 20 comprising frame, lenses and bridge. The auxiliary glasses 20 are combined with the primary glasses 10 by a magnet 14 (FIGS. 3 and 4), the primary glasses 10 having insert slots 12 formed in both temple fixing portions 11 where a permanent magnetic piece 14 is inserted into the insert piece 13, and the auxiliary glasses 20 having both combining portions 21 comprising a hinge portion 22 and a magnet receiving portion 23 in between the magnet receiving pieces 24, 25 of which an insert piece 13 of the temple fixing portion 11 of the primary glasses is inserted.

If the primary glasses 10 has dioptric lenses for correction of eyesight and the auxiliary glasses 20 have colored lenses, a wearer can obtain the effect of wearing both glasses for eyesight correction and sunglasses for protection of the eyes from sunlight.

The first characteristic of the present invention is that a magnet receiving portion 23 formed in the primary glasses 20 has two magnet receiving pieces 24, 25 in between which an insert piece 13 of the primary glasses is inserted in order to improve the combining strength. The second characteristic of the present invention is that the auxiliary glasses 20 can be folded up, therefore with no need for removal of the auxiliary glasses 20 from the primary glasses 10.

Magnet receiving pieces 24, 25, as the first characteristic of the present invention, are described as follows.

An insert slot 12 is formed in the inner side of both temple fixing portions 11 of the primary glasses, and a permanent magnetic piece 14 is inserted into an insert piece 13. Magnetic pieces 26, 27 are also inserted into the magnet receiving pieces 24, 25 of the auxiliary glasses. By inserting the insert piece 13 of the primary glasses in between the magnet receiving piece pieces 24, 25 of the auxiliary glasses 20, magnetic pieces 14, 26, 27 come in contact with each other to maintain the combining force. Particularly, the magnet receiving piece 25 is inserted tightly into the insert slot 12 of the primary glasses to maintain the strong combined state without shaking.

Then, the foldable function of the auxiliary glasses is described as follows.

Figure 8:
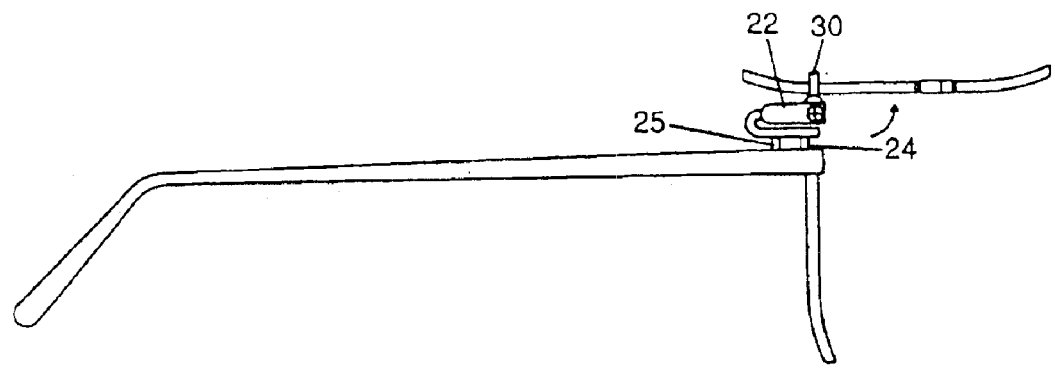
FIG. 8 is a side view showing the folded state of the auxiliary glasses according to the present invention.
Figure 9:
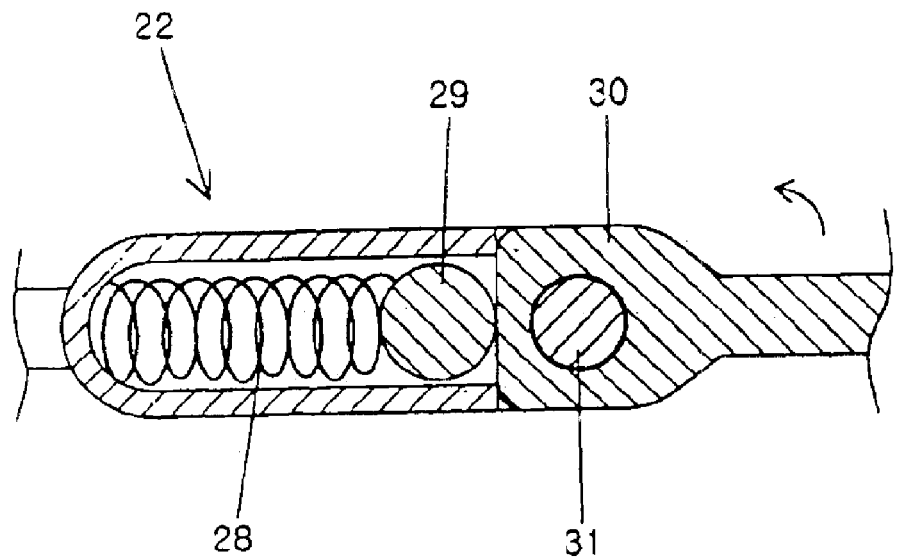
FIG. 9 is a cross-sectional view of the hinge portion of the auxiliary glasses.
Figure 10:
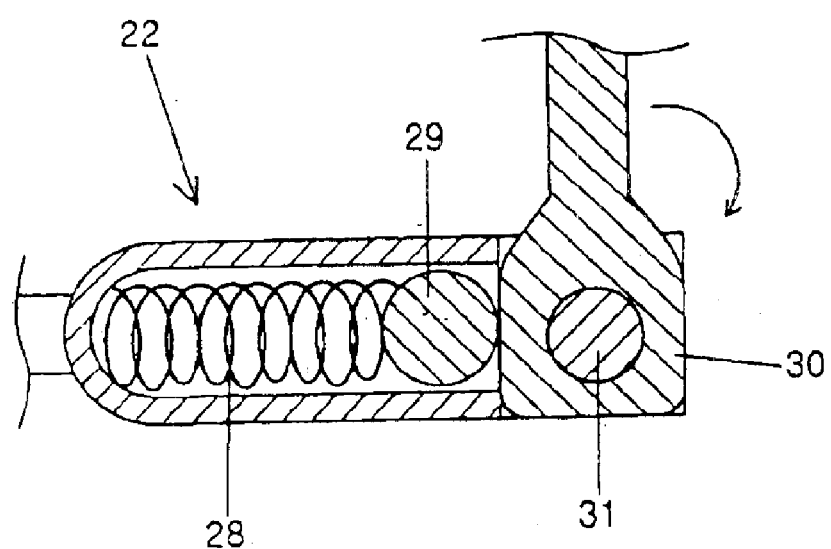
FIG. 10 is a cross-sectional view of the hinge portion of the auxiliary glasses.

Referring to FIGS. 5, 6, 7 and 8, in the combining portion 21 (FIG. 4) of the auxiliary glasses, a cylindrical hinge portion 22 has a spring 28 and a ball 29 (see FIGS. 9 and 10) in its inner side, to one end of which a foldable piece 30 is connected by a pin 31 so as to be folded up (FIGS. 6 and 8). Accordingly the foldable piece 30 is folded up centering around the pin 31 and the folded state of the foldable piece 20 is maintained by the spring 28 and ball 29 placed in the inner side of the cylindrical hinge portion 22. In the prior art, the auxiliary glasses had to be removed from the primary glasses if not needed and to be kept aside. However, the present invention provides the same effect as if the auxiliary glasses were removed from the primary glasses by folding the auxiliary glasses up at the angle of 90 degrees.

The above description of the present invention covers both primary and auxiliary glasses with inserted magnetic pieces. However, the eyeglass device according to the present invention is able to maintain a high combining strength even with no inserted magnetic pieces because the auxiliary glasses have two magnet receiving pieces 24, 25. Therefore, primary or auxiliary glasses may have no magnetic pieces or one or two magnetic pieces. In other words, the insertion of magnetic pieces is optional.

Advantages of the Invention

As the present invention is an eyeglass device comprising two pairs of glasses which are integrated together, it has a unique appearance enough to provide ornamental effect. It is also very easy to attach and detach the auxiliary glasses 20 to and from the primary glasses 20 with a simple operation. Especially the foldable auxiliary glasses 20 make it easier to use the eyeglass device.

If the primary glasses 10 have dioptric lenses for correction of eyesight and the auxiliary glasses 20 have colored glasses lenses for blocking off sunlight, even a person having bad eyesight can simply protect the eyes from sunlight and maintain corrected eyesight simultaneously.

Older people can also easily use the eyeglass device of the present invention by mounting dioptric lenses on both primary glasses 10 and auxiliary glasses 20.

As described above, the present invention provides a very unique appearance so that a wearer looks fashionable while the invention functions as sunglasses and glasses for correction of eyesight by attaching or detaching the auxiliary glasses 20, if necessary. As the auxiliary glasses 20 will not easily come off from the primary glasses 10 even when a wearer excessively moves or when an impact is applied, it is possible for the wearer to enjoy sport and exercise to the full.

While the present invention has been explained in relation to its preferred embodiment, it is to be understood that various modifications thereof will be apparent to those skilled in the art upon reading this specification. The invention disclosed herein is therefore intended to cover all such modifications that fall within the scope of the appended claims.

What is claimed is:

1. An eyeglass device comprising a pair of primary glasses comprising temples, frame, lenses, nose pads and bridge, and a pair of auxiliary glasses comprising a frame, lenses and bridge, said auxiliary glasses being combined with said primary glasses by a magnet, wherein said primary glasses have insert slots formed in a right and left temple fixing portions where a permanent magnetic piece is inserted into an insert piece, and wherein said auxiliary glasses further comprise two combining portions, each of said combining portions comprising a cylindrical hinge portion and a magnet receiving portion in between magnet receiving pieces of which said insert piece of the temple fixing portion of the primary glasses is inserted.

2. An eyeglass device according to claim 1, wherein said combining portions of said auxiliary glasses comprise a hinge portion and a magnet receiving portion, said cylindrical hinge portion having a spring and a ball in the inner side, to one end of which a foldable piece is connected by a pin so as to allow it to be folded up, said magnet receiving portion being formed under said hinge portion, magnet receiving pieces formed at the end of downward bent rear extension of said hinge portion, and a magnetic piece being inserted into each said magnet receiving piece.

3. An eyeglass device according to claim 1, wherein an insert piece of said temple fixing portion of said primary glasses and said magnet receiving pieces of said auxiliary glasses have no magnetic pieces or one or two magnetic pieces.

* * * * *